United States Patent
Zhang et al.

(10) Patent No.: US 11,476,973 B2
(45) Date of Patent: Oct. 18, 2022

(54) METHOD AND APPARATUS FOR TRANSMITTING CONTROL INFORMATION, METHOD AND APPARATUS FOR RECEIVING CONTROL INFORMATION, AND COMMUNICATION SYSTEM

(71) Applicant: ZTE Corporation, Shenzhen (CN)

(72) Inventors: Chenchen Zhang, Shenzhen (CN); Feng Bi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 43 days.

(21) Appl. No.: 17/051,830

(22) PCT Filed: May 9, 2019

(86) PCT No.: PCT/CN2019/086286
§ 371 (c)(1),
(2) Date: Oct. 30, 2020

(87) PCT Pub. No.: WO2019/214695
PCT Pub. Date: Nov. 14, 2019

(65) Prior Publication Data
US 2021/0328707 A1    Oct. 21, 2021

(30) Foreign Application Priority Data
May 11, 2018    (CN) .......................... 201810451231.2

(51) Int. Cl.
*H04L 1/00*        (2006.01)
*H04W 72/04*    (2009.01)

(52) U.S. Cl.
CPC .......... *H04L 1/0004* (2013.01); *H04L 1/0038* (2013.01); *H04W 72/042* (2013.01); *H04W 72/0453* (2013.01)

(58) Field of Classification Search
CPC ... H04L 1/0005; H04L 5/0096; H04L 1/0025; H04L 1/0003; H04L 1/0009;
(Continued)

(56) References Cited

U.S. PATENT DOCUMENTS 11,184,106 B2 * 11/2021 Hosseini ............... H04L 1/0004
2017/0207878 A1 * 7/2017 Chen ..................... H04L 1/0005
2021/0144715 A1 * 5/2021 Gotoh ............... H04W 72/0493

FOREIGN PATENT DOCUMENTS

| CN | 101686215 A | 3/2010 |
| CN | 102340370 A | 2/2012 |

(Continued)

OTHER PUBLICATIONS

International Search Report for corresponding application PCT/CN2019/086286 filed May 9, 2019; dated Jul. 29, 2019.
(Continued)

*Primary Examiner* — Jung Liu
(74) *Attorney, Agent, or Firm* — Cantor Colburn LLP

(57) ABSTRACT

Provided are a method and apparatus for transmitting control information, a method and apparatus for receiving control information, and a communication system. The method includes that: at least one modulation order of a Physical Downlink Control Channel (PDCCH) is determined; and Downlink Control Information (DCI) is modulated using the at least one modulation order.

19 Claims, 2 Drawing Sheets

Determine at least one demodulation order of a PDCCH candidate — S302

Perform blind detection and/or demodulation on the PDCCH candidate based on the at least one demodulation order — S304

(58) Field of Classification Search
CPC ..... H04L 5/0048; H04L 43/16; H04L 1/0038; H04L 1/0004; H04L 5/0094; H04L 5/001; H04L 5/0044; H04L 1/0039; H04L 1/08; H04W 8/06; H04W 24/02; H04W 72/0413; H04W 72/0493; H04W 72/14; H04W 52/16; H04W 72/042; H04W 72/1289; H04W 76/27; H04W 52/367; H04W 72/10

See application file for complete search history.

(56) References Cited

FOREIGN PATENT DOCUMENTS

| | | |
|---|---|---|
| CN | 103650447 A | 3/2014 |
| EP | 2747321 A1 | 6/2014 |

OTHER PUBLICATIONS

European Search Report for corresponding application EP 19 79 9334; Report dated May 5, 2021.

LG Electronics "Discussion on SS block, SS burst set composition and time index indication", 3GPP TSG RAN WG1 Meeting #88bis, Spakane, USA Apr. 3-7, 2017, R1-1704862.

LG Electronics. "Consideration on NR-PBCH contents and payload size", 3GPP TSG RAN WG1 NR Ad-Hoc#2, Qingdao, P.R. China Jun. 27-30, 2017, R1-1710262.

* cited by examiner

METHOD AND APPARATUS FOR TRANSMITTING CONTROL INFORMATION, METHOD AND APPARATUS FOR RECEIVING CONTROL INFORMATION, AND COMMUNICATION SYSTEM

TECHNICAL FIELD

The present disclosure relates to the field of communications, and in particular to a method and apparatus for transmitting control information, a method and apparatus for receiving control information, and a communication system.

BACKGROUND

In Long Term Evolution-Advanced (advanced LTE) of the relevant art, a relay technology can effectively expand network coverage and improve a data rate at the cell edge. With the utilization of wireless backhaul, there is no need to construct wired transmission networks, thereby achieving quick deployment and reducing the costs of the operators on the construction and operation. Hence, the relay technology serves as one of main technologies used by LTE-Adv access node ced systems. For designs of frame structures in the relay technology of the LTE-A, a time-division half-duplexing solution based on fake Multicast Broadcast Single Frequency Network (MBSFN) subframes is used. According to this time-division half-duplexing solution, based on MBSFN subframe configuration, one or more fake MBSFN subframes are configured for transmitting a backhaul link, an access link, however, uses non-MBSFN subframes, such that time-division duplexing is realized between the backhaul link and the access link, and such difference is completely transparent for a terminal.

In 5th Generation (5G) or subsequent evolution versions of 5G in the relevant art, the relay technology is also used, for example, an Integrated Access and Backhaul (IAB) technology further supports a multi-hop relay based on a 5G New Radio (NR) system, and the network topology supports a redundancy connection. In view of this, the link quality may be improved obviously. With the improvement of the link quality, a possibility is provided for the system to use a higher order of modulation manner, thereby enabling the relay technology to improve the system performance to the greatest extent.

In the LTE technology, modulation manners for a control channel and a service channel are determined differently. For a Physical Downlink Control Channel (PDCCH), in order to ensure the high reliability, the modulation manner cannot be adaptively selected, and the PDCCH can only be modulated by the use of Quadrature Phase Shift Keying (QPSK). For a Physical Downlink Service Channel (PDSCH), a base station may dynamically and adaptively determine, according to obtained channel quality information, the modulation manner of the PDSCH scheduled to a certain user, and notify the user of the determined modulation manner in PDCCH Downlink Control Information (DCI). Correspondingly, the user needs to first receive the PDCCH and then receive the PDSCH based on an indication of the PDCCH. The user, however, receives the PDCCH based on blind detection. The base station configures a plurality of search spaces for the user. Each search space includes a plurality of PDCCH candidates and supports different Aggregation Levels (ALs) of PDCCH candidates (candidate positions). The PDCCH candidate having the AL of N means that the PDCCH candidate is aggregated by four Control Channel Elements (CCEs).

In the 5G standard of the relevant art, a concept of a Band Wide Part (BWP) is further introduced. The base station may configure one or more BWPs for the terminal on one carrier, and make the terminal know the currently activated BWP or BWPs.

For the purpose of enabling the relay technology to improve the system performance to the greatest extent, the modulation order of the PDCCH may no longer be fixed as the QPSK like the LTE, so how to determine the modulation order of the PDCCH on a certain link is a problem to be solved.

Concerning the above-mentioned problem in the relevant art, effective solutions have not been proposed till now.

SUMMARY

Embodiments of the present disclosure provide a method and apparatus for transmitting control information, a method and apparatus for receiving control information, and a communication system.

According to an embodiment of the present disclosure, a method for transmitting control information is provided, which may include that: at least one modulation order of a PDCCH is determined; and DCI is modulated using the at least one modulation order.

According to an embodiment of the present disclosure, a method for receiving control information is provided, which may include that: at least one demodulation order of a PDCCH candidate is determined; and blind detection and/or demodulation is performed on the PDCCH candidate based on the at least one demodulation order.

According to another embodiment of the present disclosure, an apparatus for transmitting control information is provided, which may include: a determination module, configured to determine at least one modulation order of a PDCCH; and a generation module, configured to modulate DCI using the at least one modulation order.

According to another embodiment of the present disclosure, an apparatus for receiving control information is provided, which may include: a determination module, configured to determine at least one demodulation order of a PDCCH candidate; and a detection module, configured to perform blind detection and/or demodulation on the PDCCH candidate based on the at least one demodulation order.

According to still another embodiment of the present disclosure, a communication system is provided, which may include a transmitting terminal and a receiving terminal. The transmitting terminal includes: a determination module, configured to determine at least one modulation order of a PDCCH; and a generation module, configured to modulate DCI using the at least one modulation order. The receiving terminal includes: a determination module, configured to determine at least one demodulation order of a PDCCH candidate; and a detection module, configured to perform blind detection and/or demodulation on the PDCCH candidate based on the at least one demodulation order.

According to still another embodiment of the present disclosure, a storage medium is also provided. The storage medium stores a computer program, and the computer program, when being executed, performs the operations of any of the above method embodiment.

According to still another embodiment of the present disclosure, an electronic apparatus, which may include a memory and a processor, is also provided. The memory stores a computer program; and the processor is configured to execute the computer program to perform the operations of any of the above method embodiment.

By means of the technical solution in the embodiments of the present disclosure, at least one modulation order of the PDCCH may be determined, and DCI may be modulated using the at least one modulation order. The technical problem that the DCI can only be modulated with fixed QPSK in the relevant art is solved, and the flexibility and transmission performance of the system are improved.

BRIEF DESCRIPTION OF THE DRAWINGS

The accompanying drawings are described here to provide a deeper understanding of the present disclosure, and form a part of the present application. The schematic embodiments and description of the schematic embodiments of the present disclosure are adopted to explain the present disclosure, and are not used to constitute improper limits to the present disclosure. In the drawings.

DETAILED DESCRIPTION OF THE EMBODIMENTS

The present disclosure is described below in detail with reference to the accompanying drawings and in combination with the embodiments. It is to be noted that the embodiments of the present disclosure and the characteristics of the embodiments may be combined with each other if there is no conflict.

It should be noted that, terminologies such as "first" and "second" in the specification, claims and accompanying drawings of the present disclosure are used to distinguish similar objects, and are not used to describe a special order or a precedence order.

Embodiment 1

Figure 1:
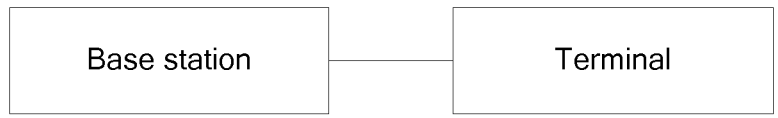
FIG. 1 is a network architecture diagram according to an embodiment of the present disclosure.

The embodiment of the present disclosure may be implemented in a network architecture shown in FIG. 1. FIG. 1 is a network architecture diagram according to an embodiment of the present disclosure. As shown in FIG. 1, the network architecture includes a base station and a terminal, and interaction may be conducted between the base station and the terminal.

Figure 2:
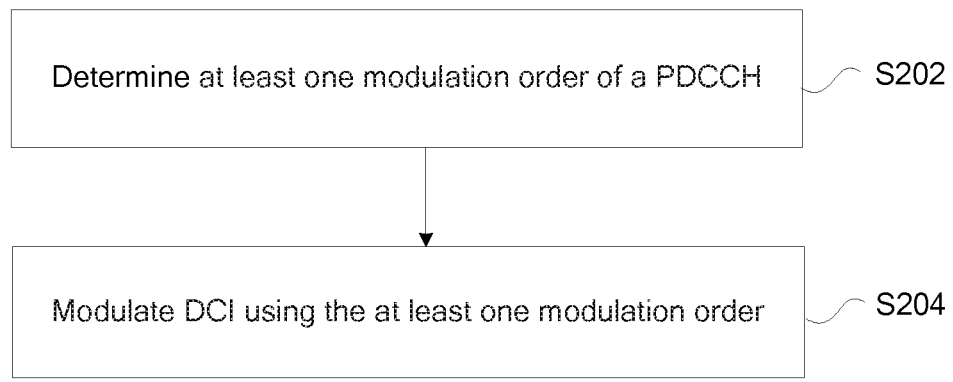
FIG. 2 is a flowchart of a method for transmitting control information according to an embodiment of the present disclosure.

The embodiment provides a method for transmitting control information that may be implemented in the network architecture. FIG. 2 is a flowchart of a method for transmitting control information according to an embodiment of the present disclosure.

As shown in FIG. 2, the process may include the following operations.

In operation S202, at least one modulation order of a PDCCH is determined.

In operation S204, DCI is modulated using the at least one modulation order.

By means of the above operations, at least one modulation order of the PDCCH may be determined, and DCI may be modulated using the at least one modulation order. The technical problem that the DCI can only be modulated with fixed QPSK in the relevant art is solved, and the flexibility and transmission performance of the system are improved.

In one or more exemplary embodiments, the executer of the above operations may be a network element at a network side, such as a base station, but is not limited thereto.

In one or more exemplary embodiments, the operation that the at least one modulation order of the PDCCH is determined may include at least one of the followings.

A system predefines the at least one modulation order of the PDCCH.

A first node semi-statically configures the at least one modulation order of the PDCCH.

The at least one modulation order of the PDCCH is determined according to a corresponding relationship between a first factor and a modulation order of the PDCCH.

The at least one modulation order of the PDCCH is determined according to a corresponding relationship between a link type and a modulation order of the PDCCH.

In one or more exemplary embodiments, before the at least one modulation order of the PDCCH is determined, the method may further include the following operation: a system predefines corresponding modulation orders of the PDCCH for different link types, wherein the system may be a high-level network element such as a core network; alternatively, a first node configures corresponding modulation orders of the PDCCH for different link types. In the one or more exemplary embodiments, the link types may include, but are not limited to, at least one of: a link between a base station and a relay node; a link between a base station and a terminal; a link between relay nodes; a link between a relay node and a terminal; a link between an anchor node and a relay node; a link between an anchor node and a terminal; a link between an nth hop of node and an mth hop of node, wherein m and n are different positive integers; and a link having a first measurement result meeting a predetermined condition. Different link types may correspond to specified modulation orders. The modulation order may be embodied as, but is not limited to, 16 Quadrature Amplitude Modulation (QAM) or 64 QAM or 256 QAM or 1024 QAM.

In one or more exemplary embodiments, in a case where multiple modulation orders of the PDCCH are determined, the multiple modulation orders may correspond to one or more link types.

In one or more exemplary embodiments, the first node may include at least one of: a base station, a relay node, an anchor node, and a node performing PDCCH configuration.

In one or more exemplary embodiments, the first measurement result may include but is not limited to: a result of measurement performed by a PDCCH receiving node based on a reference signal Single Side Band (SSB) (which is a Synchronization Signal (SS/Physical Broadcast Channel (PBCH) block) jointly composed of a Primary Synchronization Signal (PSS) and a Secondary Synchronization Signal (SSS)) of a PDCCH transmitting node; a result of measurement performed by a PDCCH receiving node based on an SS of a PDCCH transmitting node; and a result of measurement performed by a PDCCH receiving node based on a broadcast channel of a PDCCH transmitting node.

In one or more exemplary embodiments, the predetermined condition may include, but is not limited to, at least one of: the first measurement result is smaller than or equal to a threshold value; the first measurement result is greater than a threshold value; and the first measurement result is between a first threshold and a second threshold.

In one or more exemplary embodiments, the first factor may include, but is not limited to, at least one of: a PDCCH candidate AL; a PDCCH DCI format type; a PDCCH DCI format size; a search space type; a search space index; a search space blind detection occasion configuration; a BWP index; a carrier index; a CORESET index; and a BWP configuration manner. The BWP configuration manner may include, but is not limited to, at least one of configuring a BWP through a Physical Broadcast Channel (PBCH); configuring a BWP through a System Information Block (SIB) message; configuring a BWP through a Master Information Block (MIB) message; configuring a BWP through Remaining Minimization System Information (RMSI); configuring a BWP through Other System Information (OSI); configuring a BWP through Radio Resource Control (RRC) signaling; and configuring a BWP through User Equipment (UE)-specific RRC signaling.

In one or more exemplary embodiments, the corresponding relationship between the first factor and the modulation order of the PDCCH is determined in one of the following manners: a system predefines the corresponding relationship, and a first node semi-statically configures the corresponding relationship.

Figure 3:
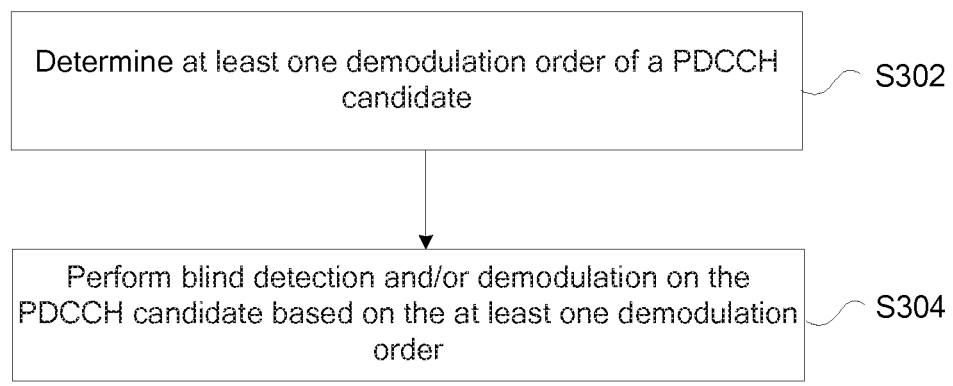
FIG. 3 is a flowchart of a method for receiving control information according to an embodiment of the present disclosure.

An embodiment provides a method for receiving control information that is implemented in the network architecture. FIG. 3 is a flowchart of a method for receiving control information according to an embodiment of the present disclosure.

As shown in FIG. 3, the process may include the following operations.

In operation S302, at least one demodulation order of a PDCCH candidate is determined.

In operation S304, blind detection and/or demodulation is performed on the PDCCH candidate based on the at least one demodulation order.

In one or more exemplary embodiments, the operation that the at least one demodulation order of the PDCCH candidate, for which the blind detection is to be performed, is determined may include, but is not limited to, one of: the at least one demodulation order of the PDCCH candidate is determined according to a corresponding relationship between a link type and a modulation order, wherein the link type is a link type of a link for transmitting a PDCCH; the at least one demodulation order of the PDCCH candidate is determined according to a corresponding relationship between a PDCCH candidate AL and a modulation order; the at least one demodulation order of the PDCCH candidate is determined according to a corresponding relationship between a DCI format size and a modulation order; the at least one demodulation order of the PDCCH candidate is determined according to a corresponding relationship between a DCI format type and a modulation order; the at least one demodulation order of the PDCCH candidate is determined according to a corresponding relationship between a search space type and a modulation order; the at least one demodulation order of the PDCCH candidate is determined according to a corresponding relationship between a search space occasion and a modulation order; the at least one demodulation order of the PDCCH candidate is determined according to a corresponding relationship between a BWP index and a modulation order; the at least one demodulation order of the PDCCH candidate is determined according to a corresponding relationship between a carrier index and a modulation order; the at least one demodulation order of the PDCCH candidate is determined according to a corresponding relationship between a CORESET Identifier (ID) and a modulation order; and the at least one demodulation order of the PDCCH candidate is determined according to a corresponding relationship between a BWP configuration manner and a modulation order.

By means of the above-mentioned descriptions on the implementation mode, those skilled in the art may clearly understand that the technical solutions in the embodiments of the present disclosure may be implemented by software plus a necessary universal hardware platform, and may alternatively be implemented by hardware, but under most conditions, the former is a better implementation mode. Based on such an understanding, the essence of the technical solutions of the embodiments of the present disclosure, or the part contributing to the relevant art may be implemented in a form of a software product. The computer software product is stored in a storage medium (such as a Read Only Memory (ROM)/Random Access Memory (RAM), a magnetic disk, and an optical disc) and includes a plurality of instructions for instructing a terminal device (which may be a mobile phone, a computer, a server, or a network device) to execute the methods described in the embodiments of the present disclosure.

Embodiment 2

The embodiment also provides apparatuses for transmitting and receiving control information. The apparatuses are configured to implement the above-mentioned embodiments and exemplary implementation modes. A content that has been described will no longer be repeated. As used below, the term "module" may implement a combination of software and/or hardware having a predetermined function. Although the apparatuses described in the following embodiments are implemented by software preferably, the implementation of hardware or a combination of the software and the hardware may also be conceivable.

Figure 4:
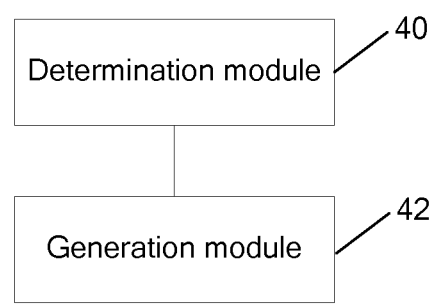
FIG. 4 is a structural block diagram of an apparatus for transmitting control information according to an embodiment of the present disclosure.

FIG. 4 is a structural block diagram of an apparatus for transmitting control information according to an embodiment of the present disclosure. As shown in FIG. 4, the apparatus may include a determination module 40 and a generation module 42.

The determination module 40 is configured to determine at least one modulation order of a PDCCH.

The generation module 42 is configured to modulate DCI using the at least one modulation order.

Figure 5:
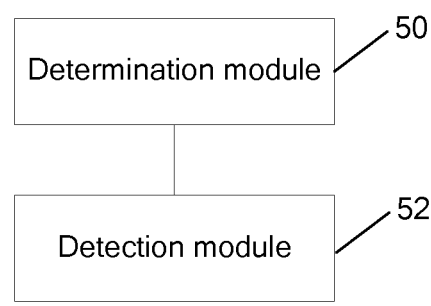
FIG. 5 is a structural block diagram of an apparatus for receiving control information according to an embodiment of the present disclosure.

FIG. 5 is a structural block diagram of an apparatus for receiving control information according to an embodiment of the present disclosure. As shown in FIG. 5, the apparatus may include a determination module 50 and a detection module 52.

The determination module 50 is configured to determine at least one demodulation order of a PDCCH candidate.

The detection module 52 is configured to perform blind detection and/or demodulation on the PDCCH candidate based on the at least one demodulation order.

The embodiment also provides a communication system, which may include a transmitting terminal shown in FIG. 4 and a receiving terminal shown in FIG. 5.

It is to be noted that each module may be implemented by software or hardware. The latter may be implemented via the following manner but is not limited thereto: the above modules are located in the same processor; or the above modules are respectively located in different processors in any combined form.

Embodiment 3

The embodiment provides a plurality of methods for determining at least one modulation order of the PDCCH of a specific link, including a system predefinition method, a semi-static configuration method of a specific node, and a method for dynamically determining the at least one modulation order of the PDCCH according to a specific factor and a preset rule. The preset rule may be predefined by a system or semi-statically configured by a specific node.

The embodiment provides a PDCCH blind detection method. At least one modulation order of the PDCCH is determined based on at least one of the following manners: a system predefines the at least one modulation order of the PDCCH; a first node semi-statically configures the at least one modulation order of the PDCCH; and the at least one modulation order of the PDCCH is dynamically determined according to a first rule. According to the determined at least one modulation order of the PDCCH, the transmitting terminal modulates PDCCH DCI, and the corresponding receiving terminal performs blind detection or demodulation on a PDCCH candidate.

The determination process of the at least one modulation order of the PDCCH is described in detail below with exemplary implementation modes.

Implementation Mode 1: A New Modulation Order is Directly Standardized for PDCCH Modulation The system predefines a modulation manner of the PDCCH for all links or a part of links in the system. Several examples are provided below.

The system predefines a modulation manner of the PDCCH, which may exemplarily be 16 QAM or 64 QAM or 256 QAM or 1024 QAM but is not limited thereto. The modulation manner of the PDCCH predefined by the system is effective to all air interface links.

Alternatively, the system defines one or more modulation manners of the PDCCH. Each modulation manner may be QPSK or 16 QAM or 64 QAM or 256 QAM or 1024 QAM but is not limited thereto. The one or more modulation manners of the PDCCH may respectively correspond to different air interface link types, and the air interface link types may exemplarily include one or more of:

a link between a gNB and a relay node, with the modulation manner of the PDCCH being a system predefined modulation manner M_a of the PDCCH;

a link between a gNB and a UE, with the modulation manner of the PDCCH being a system predefined modulation manner M_b of the PDCCH;

a link between a relay node and a UE, with the modulation manner of the PDCCH being a system predefined modulation manner M_c of the PDCCH;

a link between relay nodes, with the modulation manner of the PDCCH being a system predefined modulation manner M_d of the PDCCH;

a link between a target node and another node, when the result of measurement performed by the target node on the link based on a certain reference signal meets a condition based on a threshold 1 or an interval 1, the modulation manner of the PDCCH transmitted on the link being a system predefined modulation manner M_e of the PDCCH;

a link between a target node and another node, when the result of measurement performed by the target node on the link based on a certain reference signal meets a condition based on a threshold 2 or an interval 2, the modulation manner of the PDCCH transmitted on the link being a system predefined modulation manner M_f of the PDCCH;

a link between a target node located on an nth hop and another node located on an mth hop, when n and m meet a relationship 1, the modulation manner of the PDCCH transmitted on the link between the target node and the other node being a system predefined modulation manner M_g of the PDCCH; and a link between the target node located on an nth hop and another node located on an mth hop, when n and m meet a relationship 2, the modulation manner of the PDCCH transmitted on the link between the target node and the other node being a system predefined modulation manner M_h of the PDCCH.

The above modulation manners M_a, M_b, M_c, M_d, M_e, M_f, M_g and M_h are all system predefined modulation manners of the PDCCH.

Implementation Mode 2: The System Semi-Statically Configures the Modulation Orders of the PDCCH for Different Links A PDCCH modulation configuration node in the system semi-statically configures one or more modulation manners of the PDCCH for the target node. Several examples are provided below.

The PDCCH modulation configuration node semi-statically configures one modulation manner of the PDCCH for the target node. The modulation manner of the PDCCH may exemplarily be 16 QAM or 64 QAM or 256 QAM or 1024 QAM but is not limited thereto. The PDCCH modulation of the air interface link between the target node and any other node uses the semi-statically configured modulation manner of the PDCCH.

Alternatively, the PDCCH modulation configuration node semi-statically configures one or more modulation manners of the PDCCH for the target node. Each modulation manner may be QPSK or 16 QAM or 64 QAM or 256 QAM or 1024 QAM but is not limited thereto. The one or more modulation manners of the PDCCH may respectively correspond to different air interface link types, and the air interface link types may exemplarily include one or more of:

a link between the PDCCH modulation configuration node and a target node, with the modulation manner of the PDCCH being a system predefined modulation manner M_a of the PDCCH;

a link between a target node and other nodes except for the PDCCH modulation configuration node, with the modulation manner of the PDCCH being a system predefined modulation manner M_b of the PDCCH;

a link between a target node and a gNB, with the modulation manner of the PDCCH being a system predefined modulation manner M_c of the PDCCH;

a link between a target node and a relay node, with the modulation manner of the PDCCH being a system predefined modulation manner M_d of the PDCCH;

a link between a target node and a UE, with the modulation manner of the PDCCH being a system predefined modulation manner M_e of the PDCCH;

a link between a target node, which is the nth hop of node, and the mth hop of node, with the modulation manner of the PDCCH being a system predefined modulation manner M_f of the PDCCH; and a link between a target node, which is the nth hop of node, and the xth hop of node, with the modulation manner of the PDCCH being a system predefined modulation manner M_g of the PDCCH.

The above modulation manners M_a, M_b, M_c, M_d, M_e, M_f and M_g are all modulation manners of the PDCCH semi-statically configured by the PDCCH configuration node. The PDCCH configuration node may be a gNB or a relay or a UE, and the target node may be a gNB or a relay or a UE.

Implementation Mode 3: The Modulation Order is Relevant to the AL

Which modulation order(s) of the PDCCH is used to transmit the PDCCH between the first node and the second node is relevant to the AL of the candidate used to transmit the PDCCH DCI. The corresponding relationship between the modulation orders of the PDCCH and the ALs of the PDCCH candidates may be predefined by a system or semi-statically configured by a PDCCH modulation configuration node. Several examples are provided below.

The higher the AL of the PDCCH candidate, the higher the order of the modulation manner of the PDCCH. Alternatively, the lower the AL of the PDCCH candidate, the lower the order of the modulation manner of the PDCCH.

For the PDCCH candidate with an aggregation level of AL={1 2}, a higher-order modulation manner is used, such as 16 QAM or 64 QAM or 256 QAM or 1024 QAM.

For the PDCCH candidate with an aggregation level of AL={4 8}, a lower-order modulation manner is used, such as QPSK or 16 QAM or 64 QAM or 256 QAM.

For the PDCCH candidate with an aggregation level of AL={16 32}, an even lower-order modulation manner is used, such as QPSK or 16 QAM or 64 QAM.

According to the corresponding relationship between the AL of the PDCCH candidate (i.e., PDCCH candidate AL) and the modulation order of the PDCCH, when blindly detecting or demodulating the PDCCH that may be transmitted by the second node, the first node uses the corresponding demodulation order according to the AL of the blindly detected PDCCH candidate.

Implementation Mode 4: The Modulation Order is Relevant to the DCI Format Size

Which modulation order(s) of the PDCCH is used to transmit the PDCCH between the first node and the second node is relevant to the size of the DCI format used to transmit the PDCCH DCI. The corresponding relationship between different DCI format sizes and the modulation orders of the PDCCH may be predefined by a system or semi-statically configured by a PDCCH modulation configuration node. Several examples are provided below.

The smaller the DCI format size for transmission, the lower the order of the modulation manner of the PDCCH. The larger the DCI format size for transmission, the higher the order of the modulation manner of the PDCCH.

For fallback DCI such as DCI format x_0, a lower-order modulation manner, such as QPSK or 16 QAM or 64 QAM or 256 QAM, is used.

For non-fallback DCI such as DCI format except for DCI format x_0, a higher-order modulation manner, such as 16 QAM or 64 QAM or 256 QAM or 1024 QAM, is used.

If the system or the first node supports n DCI format sizes, and the specific sizes are $N\_0, N\_1, \ldots, N\_{n-1}$, the n DCI format sizes may respectively correspond to modulation orders $M\_0, M\_1, \ldots, M\_{n-1}$ of the PDCCH. Herein, the modulation orders $M\_0, M\_1, \ldots, M\_{n-1}$ may be selected from QPSK, 16 QAM, 64 QAM, 256QAM and 1024 QAM, and may be mutually the same or different.

According to the corresponding relationship between the DCI format sizes and the modulation orders of the PDCCH, when blindly detecting or demodulating the PDCCH that may be transmitted by the second node, the first node uses the corresponding demodulation order according to the DCI format size used for the blind detection.

Implementation Mode 5: The Modulation Order is Relevant to the DCI Format Type

Which modulation order(s) of the PDCCH is used to transmit the PDCCH between the first node and the second node is relevant to which DCI format is used to transmit the PDCCH DCI. The corresponding relationship between different DCI formats and the modulation orders of the PDCCH may be predefined by a system or semi-statically configured by a PDCCH modulation configuration node. Several examples are provided below.

The DCI format x0_y0 corresponds to a modulation order M_a of the PDCCH.

The DCI format x1_y1 corresponds to a modulation order M_b of the PDCCH.

The DCI format x0_y1 corresponds to a modulation order M_c of the PDCCH.

The DCI format x1_y0 corresponds to a modulation order M_d of the PDCCH.

The DCI format x2_y2 corresponds to a modulation order M_e of the PDCCH.

The DCI format x2_y0 corresponds to a modulation order M_f of the PDCCH.

The DCI format x2_y1 corresponds to a modulation order M_g of the PDCCH.

The DCI format x0_y2 corresponds to a modulation order M_h of the PDCCH.

The DCI format x1_y2 corresponds to a modulation order M_i of the PDCCH.

The above modulation manners M_a, M_b, M_c, M_d, M_e, M_f, M_g, M_h and M_i are all modulation orders of the PDCCH, and may be mutually the same or different.

According to the corresponding relationship between the DCI formats and the modulation orders of the PDCCH, when blindly detecting or demodulating the PDCCH that may be transmitted by the second node, the first node uses the corresponding demodulation order according to the DCI format used for the blind detection.

Implementation Mode 6: The Modulation Order is Relevant to the Type of the Search Space Which modulation order(s) of the PDCCH is used to transmit the PDCCH between the first node and the second node is relevant to the search space for the blind detection. The corresponding relationship between different search spaces and the modulation orders of the PDCCH may be predefined by a system or semi-statically configured by a PDCCH modulation configuration node. Several examples are provided below.

All PDCCH candidates in a common search space correspond to a modulation order M_a of the PDCCH.

All PDCCH candidates in node-specific search spaces or non-common search spaces correspond to a modulation order M_b of the PDCCH.

Alternatively, all PDCCH candidates included in a search space 1 for the DCI of a blind detection type 1 correspond to a modulation order M_a of the PDCCH.

All PDCCH candidates included in a search space 2 for the DCI of a blind detection type 2 correspond to a modulation order M_b of the PDCCH.

The above modulation manners M_a and M_b are the modulation manners of the PDCCH, and may be mutually the same or different.

According to the corresponding relationship between the specific search spaces and the modulation orders of the PDCCH, when blindly detecting or demodulating the PDCCH that may be transmitted by the second node, the first node uses the corresponding demodulation order according to the search space used for the blind detection.

Implementation Mode 7: The Modulation Order is Relevant to the Search Space Occasion Which modulation order(s) of the PDCCH is used to transmit the PDCCH between the first node and the second node is relevant to the configuration of a blind detection occasion of the search space for the blind detection. The corresponding relationship between search spaces configured for different blind detection occasions and the modulation orders of the PDCCH may be predefined by a system or semi-statically configured by a PDCCH modulation configuration node. Several examples are provided below.

When the blind detection occasion is configured in a search space with a frequent time domain, a higher modulation order of the PDCCH may be used. When the blind detection occasion is configured in a search space with a less frequent time domain, a lower modulation order of the PDCCH may be used.

In a search space of which the blind detection period is configured as P1, all PDCCH candidates included in the search space correspond to a modulation order M_a of the PDCCH.

In a search space of which the blind detection period is configured as P2, all PDCCH candidates included in the search space correspond to a modulation order M_b of the PDCCH.

The above modulation manners M_a and M_b are the modulation manners of the PDCCH, and may be mutually the same or different.

According to the corresponding relationship between the search spaces configured with specific periods and the modulation orders of the PDCCH, when blindly detecting or demodulating the PDCCH that may be transmitted by the second node, the first node uses the corresponding demodulation order according to the configured period of the search space for the blind detection.

Implementation Mode 8: The Modulation Order is Relevant to the BWP

Which modulation order(s) of the PDCCH is used to transmit the PDCCH between the first node and the second node is semi-statically configured by a PDCCH modulation configuration node. The PDCCH modulation configuration node may configure to use a specific modulation order of the PDCCH when the PDCCH is blindly detected on a specific BWP. Several examples are provided below.

When the PDCCH is blindly detected on the CORESET and/or search space of which the frequency domain range pertains to the BWP1, all PDCCH candidates included in the CORESET and/or search space correspond to a modulation order M_a of the PDCCH.

When the PDCCH is blindly detected on the CORESET and/or search space of which the frequency domain range pertains to the BWP2, all PDCCH candidates included in the CORESET and/or search space correspond to a modulation order M_b of the PDCCH.

The above modulation manners M_a and M_b are the modulation manners of the PDCCH, and may be mutually the same or different.

According to the corresponding relationship between the BWPs to which the CORESET and/or search space for the blind detection corresponds and the modulation orders of the PDCCH, when blindly detecting or demodulating the PDCCH that may be transmitted by the second node, the first node uses the corresponding demodulation order according to the BWP to which the CORESET and/or search space for the blind detection corresponds.

Implementation Mode 9: The Modulation Order is Relevant to the Carrier

Which modulation order(s) of the PDCCH is used to transmit the PDCCH between the first node and the second node is semi-statically configured by a PDCCH modulation configuration node. The PDCCH modulation configuration node may configure to use a specific modulation order of the PDCCH when the PDCCH is blindly detected on a specific carrier. Several examples are provided below.

When the PDCCH is blindly detected on the CORESET and/or search space of which the frequency domain range pertains to the carrier 1, all PDCCH candidates included in the CORESET and/or search space correspond to a modulation order M_a of the PDCCH.

When the PDCCH is blindly detected on the CORESET and/or search space of which the frequency domain range pertains to the carrier 2, all PDCCH candidates included in the CORESET and/or search space correspond to a modulation order M_b of the PDCCH.

The above modulation manners M_a and M_b are the modulation manners of the PDCCH, and may be mutually the same or different.

According to the corresponding relationship between the carriers to which the CORESET and/or search space for the blind detection corresponds and the modulation orders of the PDCCH, when blindly detecting or demodulating the PDCCH that may be transmitted by the second node, the first node uses the corresponding demodulation order according to the carrier to which the CORESET and/or search space for the blind detection corresponds.

Implementation Mode 10: The Modulation Order is Relevant to the CORESET ID

Which modulation order(s) of the PDCCH is used to transmit the PDCCH between the first node and the second node is semi-statically configured by a PDCCH modulation configuration node. The PDCCH modulation configuration node may configure to use a specific modulation order of the PDCCH when the PDCCH is blindly detected on a special CORESET. Several examples are provided below.

When the PDCCH is blindly detected on the CORESET 1, all included PDCCH candidates correspond to a modulation order M_a of the PDCCH.

When the PDCCH is blindly detected on the CORESET 2, all included PDCCH candidates correspond to a modulation order M_b of the PDCCH.

The above modulation manners M_a and M_b are the modulation manners of the PDCCH, and may be mutually the same or different.

According to the corresponding relationship between the CORESETs for the blind detection and the modulation orders of the PDCCH, when blindly detecting or demodulating the PDCCH that may be transmitted by the second node, the first node uses the corresponding demodulation order according to the CORESET for the blind detection.

Implementation Mode 11:

For BWPs configured by system messages such as PBCH, RMSI, OSI, MIB and SIB, or initial BWPs, a system may predefine that the PDCCHs transmitted on these BWPs use a modulation order 1. The modulation order 1 may be QPSK or 16 QAM or 64 QAM.

For BWPs configured by UE-specific RRC signaling, what modulation orders are used by the PDCCHs transmitted on these BWPs may refer to the above-mentioned implementation modes.

Embodiment 4

The embodiment of the present disclosure also provides a storage medium. The storage medium stores a computer program, and the computer program, when being executed, performs the operations of any of the above method embodiments.

In one or more exemplary embodiment, the storage medium may be configured to store a computer program for executing the following operation:

In operation S1, at least one modulation order of a PDCCH is determined.

In operation S2, DCI is modulated using the at least one modulation order.

In one or more exemplary embodiment, the storage medium may include, but is not limited to, various medium capable of storing the computer program, such as a U disk, an ROM, an RAM, a mobile hard disk, a magnetic disk or an optical disc.

An embodiment of the present disclosure also provides an electronic apparatus, which may include a memory and a processor. The memory stores a computer program, and the processor is configured to execute the computer program to perform the operations of any of the above method embodiments.

In one or more exemplary embodiment, the electronic device may further include a transmission device and an input/output device, the transmission device is connected to the processor, and the input/output device is connected to the processor.

In one or more exemplary embodiment, the processor may be configured to execute the following operations through the computer program.

In operation S1, at least one modulation order of a PDCCH is determined.

In operation S2, DCI is modulated using the at least one modulation order.

In one or more exemplary embodiment, the specific example in this embodiment may be referred to the examples described in the above embodiments and exemplary implementation modes, and will no longer be repeated herein.

It is apparent that those skilled in the art should understand that the modules or operations of the embodiments of the present disclosure may be implemented by a general-purpose computing device and centralized in a single computing device or distributed over a network consisting of a plurality of computing devices. Optionally, they may be implemented by a program code executable by a computing device, so that they may be stored in a storage device and executed by the computing device. Moreover, in some cases, the operations illustrated or described herein may be executed in an order different from the order given in the embodiments, or the operations illustrated or described herein may be implemented by respectively fabricating them into respective integrated circuit modules or by fabricating a plurality of modules or operations into a single integrated circuit module. By doing so, the embodiments of the present disclosure are not limited to any specific combination of hardware and software.

The above are only exemplary embodiments of the present disclosure and should not be used for limiting the present disclosure. For those skilled in the art, the embodiments of the present disclosure may have various modifications and changes. Any modifications, equivalent replacements, improvements and the like within the principle of the embodiments of the present disclosure should be included in the scope of protection of the present disclosure.

INDUSTRIAL APPLICABILITY

The embodiments of the present disclosure are applied to the field of wireless communications. By means of the technical solution in the embodiments of the present disclosure, at least one modulation order of the PDCCH may be determined, and DCI may be modulated using the at least one modulation order. The technical problem that the DCI can only be modulated with fixed QPSK in the relevant art is solved, and the flexibility and transmission performance of the system are improved.

What is claimed is:

1. A method for transmitting control information, comprising:
   determining at least one modulation order of a Physical Downlink Control Channel (PDCCH); and
   modulating Downlink Control Information (DCI) using the at least one modulation order;
   wherein determining the at least one modulation order of the PDCCH comprises:
   determining the at least one modulation order of the PDCCH according to a corresponding relationship between a link type and a modulation order of the PDCCH;
   wherein the link types comprise at least one of:
   a link between a base station and a relay node;
   a link between a base station and a terminal;
   a link between relay nodes;
   a link between a relay node and a terminal;
   a link between an anchor node and a relay node;
   a link between an anchor node and a terminal;
   a link between an nth hop of node and an mth hop of node, wherein m and n are different positive integers; and
   a link having a first measurement result meeting a predetermined condition.

2. The method as claimed in claim 1, wherein determining the at least one modulation order of the PDCCH further comprises at least one of:
   predefining, by a system, the at least one modulation order of the PDCCH;
   semi-statically configuring, by a first node, the at least one modulation order of the PDCCH; and
   determining the at least one modulation order of the PDCCH according to a corresponding relationship between a first factor and a modulation order of the PDCCH.

3. The method as claimed in claim 1, before determining the at least one modulation order of the PDCCH, further comprising:
   predefining, by a system, corresponding modulation orders of the PDCCH for different link types, or configuring, by a first node, corresponding modulation orders of the PDCCH for different link types.

4. The method as claimed in claim 2, wherein in a case where multiple modulation orders of the PDCCH are determined, the multiple modulation orders correspond to one or more link types.

5. The method as claimed in claim 2, wherein the first node comprises at least one of: a base station, a relay node, an anchor node, and a node performing PDCCH configuration.

6. The method as claimed in claim 1, wherein the first measurement result comprises at least one of:
   a result of measurement performed by a PDCCH receiving node based on a reference signal of a PDCCH transmitting node;
   a result of measurement performed by a PDCCH receiving node based on a Synchronization Signal (SS) of a PDCCH transmitting node; and
   a result of measurement performed by a PDCCH receiving node based on a broadcast channel of a PDCCH transmitting node.

7. The method as claimed in claim 1, wherein the predetermined condition comprises at least one of:
the first measurement result is smaller than or equal to a threshold value;
the first measurement result is greater than a threshold value; and
the first measurement result is between a first threshold and a second threshold.

8. The method as claimed in claim 2, wherein the first factor comprises at least one of:
a PDCCH candidate Aggregation Level (AL); a PDCCH DCI format type; a PDCCH DCI format size; a search space type; a search space index; a search space blind detection occasion configuration; a Band Wide Part (BWP) index; a carrier index; a CORESET index; and a BWP configuration manner.

9. The method as claimed in claim 8, wherein the BWP configuration manner comprises at least one of:
configuring a BWP through a Physical Broadcast Channel (PBCH); configuring a BWP through a System Information Block (SIB) message; configuring a BWP through a Master Information Block (MIB) message; configuring a BWP through Remaining Minimization System Information (RMSI); configuring a BWP through Other System Information (OSI); configuring a BWP through Radio Resource Control (RRC) signaling; and configuring a BWP through User Equipment (UE)-specific RRC signaling.

10. The method as claimed in claim 2, wherein the corresponding relationship between the first factor and the modulation order of the PDCCH is determined in one of the following manners: predefining by a system, and semi-statically configuring by a first node.

11. The method as claimed in claim 2, wherein determining the at least one modulation order of the PDCCH according to the corresponding relationship between the first factor and the modulation order of the PDCCH comprises:
when a value of the first factor is in a first range, determining the modulation order of the PDCCH to be a first modulation order; and when a value of the first factor is in a second range, determining the modulation order of the PDCCH to be a second modulation order, wherein the first range and the second range are preset values or preset intervals.

12. A method for receiving control information, comprising:
determining at least one demodulation order of a Physical Downlink Control Channel (PDCCH) candidate; and
performing blind detection and/or demodulation on the PDCCH candidate based on the at least one demodulation order;
wherein determining the at least one demodulation order of the PDCCH candidate comprises:
determining the at least one demodulation order of the PDCCH candidate according to a corresponding relationship between a link type and a modulation order, wherein the link type is a link type of a link for transmitting a PDCCH;
wherein the link types comprise at least one of:
a link between a base station and a relay node;
a link between a base station and a terminal;
a link between relay nodes;
a link between a relay node and a terminal;
a link between an anchor node and a relay node;
a link between an anchor node and a terminal;
a link between an nth hop of node and an mth hop of node, wherein m and n are different positive integers; and
a link having a first measurement result meeting a predetermined condition.

13. The method as claimed in claim 12, wherein determining the at least one demodulation order of the PDCCH candidate further comprises one of:
determining the at least one demodulation order of the PDCCH candidate according to a corresponding relationship between a PDCCH candidate Aggregation Level (AL) and a modulation order;
determining the at least one demodulation order of the PDCCH candidate according to a corresponding relationship between a Downlink Control Information (DCI) format size and a modulation order;
determining the at least one demodulation order of the PDCCH candidate according to a corresponding relationship between a DCI format type and a modulation order;
determining the at least one demodulation order of the PDCCH candidate according to a corresponding relationship between a search space type and a modulation order;
determining the at least one demodulation order of the PDCCH candidate according to a corresponding relationship between a search space occasion and a modulation order;
determining the at least one demodulation order of the PDCCH candidate according to a corresponding relationship between a Band Wide Part (BWP) index and a modulation order;
determining the at least one demodulation order of the PDCCH candidate according to a corresponding relationship between a carrier index and a modulation order;
determining the at least one demodulation order of the PDCCH candidate according to a corresponding relationship between a CORESET Identifier (ID) and a modulation order; and
determining the at least one demodulation order of the PDCCH candidate according to a corresponding relationship between a BWP configuration manner and a modulation order.

14. An apparatus for transmitting control information, comprising: a memory and a processor, wherein the memory stores a computer program, and the processor is configured to execute the computer program to perform the method as claimed in claim 1.

15. An apparatus for receiving control information, comprising: a memory and a processor, wherein the memory stores a computer program, and the processor is configured to execute the computer program to perform the method as claimed in claim 12.

16. A communication system, comprising a transmitting terminal and a receiving terminal, wherein
the transmitting terminal comprises a processor which is configured to execute the following program modules:
a determination module, configured to determine at least one modulation order of a Physical Downlink Control Channel (PDCCH); and
a generation module, configured to modulate Downlink Control Information (DCI) using the at least one modulation order; and
the receiving terminal comprises a processor which is configured to execute the following program modules:
a determination module, configured to determine at least one demodulation order of a PDCCH candidate; and a detection module, configured to perform blind detection and/or demodulation on the PDCCH candidate based on the at least one demodulation order;

wherein the at least one modulation order of the PDCCH is determined according to a corresponding relationship between a link type and a modulation order of the PDCCH;

wherein the link types comprise at least one of:

a link between a base station and a relay node;

a link between a base station and a terminal;

a link between relay nodes;

a link between a relay node and a terminal;

a link between an anchor node and a relay node;

a link between an anchor node and a terminal;

a link between an nth hop of node and an mth hop of node, wherein m and n are different positive integers; and a link having a first measurement result meeting a predetermined condition.

17. A storage medium, storing a computer program, wherein the computer program, when being executed, performs the method as claimed in claim 1.

18. An electronic apparatus, comprising a memory and a processor, wherein the memory stores a computer program, and the processor is configured to execute the computer program to perform the method as claimed in claim 1.

19. A storage medium, storing a computer program, wherein the computer program, when being executed, performs the method as claimed in claim 12.

* * * * *